United States Patent [19]

Ranganathan et al.

[11] 4,214,977
[45] Jul. 29, 1980

[54] HYDROCRACKING OF HEAVY OILS USING IRON COAL CATALYST

[75] Inventors: Ramaswami Ranganathan, Ottawa; Jean-Marie D. Denis, Munster; Barry B. Pruden, Ottawa, all of Canada

[73] Assignee: Energy Mines and Resources Canada, Ottawa, Canada

[21] Appl. No.: 20,505

[22] Filed: Mar. 14, 1979

Related U.S. Application Data

[62] Division of Ser. No. 951,013, Oct. 13, 1978, abandoned.

[30] Foreign Application Priority Data

Oct. 24, 1977 [CA] Canada ..................... 289320

[51] Int. Cl.² ............... C10G 13/04; C10G 9/16; C10G 1/06; B01J 23/70
[52] U.S. Cl. ............................. 208/108; 208/10; 208/48 AA; 252/472
[58] Field of Search ............ 208/108, 112, 48 R, 208/10, 48 AA; 252/472

[56] References Cited

U.S. PATENT DOCUMENTS 2,939,835  6/1960  Varga et al. ............... 208/108

FOREIGN PATENT DOCUMENTS 829344 12/1951 Fed. Rep. of Germany ........... 208/108
933648  9/1955 Fed. Rep. of Germany ........... 208/108

OTHER PUBLICATIONS

Bureau of Mines Bulletin No. 622 Part 3, "Coal Hydrogenation Catalysts", pp. 12–28 (1965).

*Primary Examiner*—Delbert E. Gantz
*Assistant Examiner*—G. E. Schmitkons

[57] ABSTRACT

An improved process is described for the hydrocracking of heavy hydrocarbon oil, such as oils extracted from tar sands. The charge oil in the presence of an excess of hydrogen is passed through a tubular hydrocracking zone, and the effluent emerging from the top of the zone is separated into a gaseous stream containing a wide boiling range material and a liquid stream containing heavy hydrocarbons. According to the novel feature, the charge oil is in the form of a slurry together with an iron-coal catalyst. The presence of this catalyst in the charge oil serves to greatly reduce coke precursors, such as benzene and pentane insolubles, and thereby prevent the formation of carbonaceous deposits in the reaction zone.

14 Claims, 1 Drawing Figure

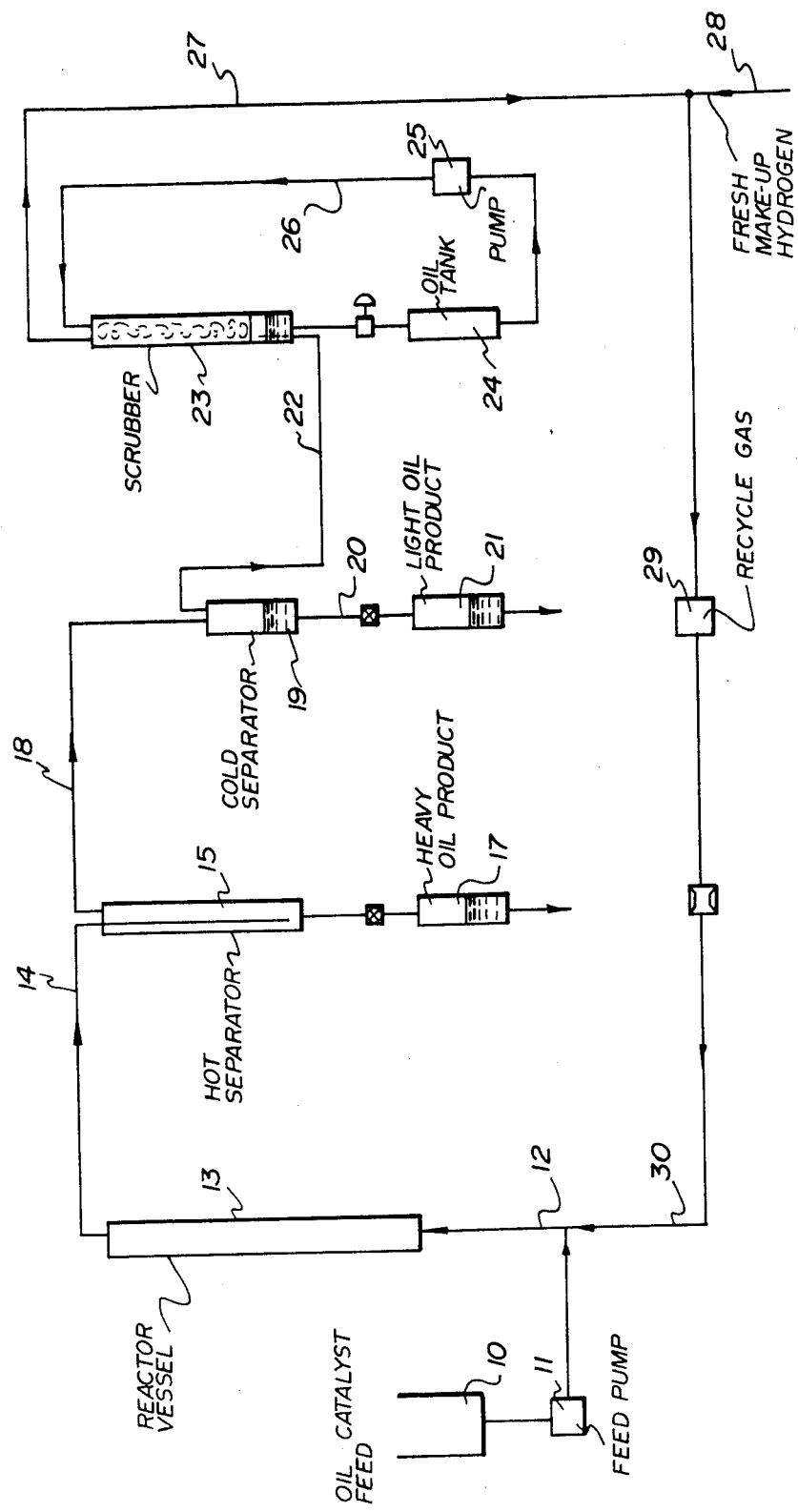

HYDROCRACKING OF HEAVY OILS USING IRON COAL CATALYST

This is a division, of application Ser. No. 951,013, filed on Oct. 13, 1978 and now abandoned.

This invention relates to the treatment of hydrocarbon oils and, more particularly, to the hydrocracking of heavy hydrocarbon oils to produce improved products of lower boiling range.

Hydrocracking processes for the conversion of heavy hydrocarbon oils to light and intermediate naphthas of good quality for reforming feed stocks, fuel oil and gas oil are well known. These heavy hydrocarbon oils can be such materials as petroleum crude oil, atmospheric tar bottoms products, vacuum tar bottoms products, heavy cycle oils, shale oils, coal derived liquids, crude oil residuum, topped crude oils and the heavy bituminous oils extracted from oil sands. Of particular interest are the oils extracted from oil sands and which contain wide boiling range materials from naphthas through kerosene, gas oil, pitch, etc. and which contain a large portion of material boiling above 524° C.

The heavy hydrocarbon oils of the above type tend to contain nitrogenous and sulphurous compounds in exceedingly large quantities. In addition, such heavy hydrocarbon fractions frequently contain excessive quantities of organo-metallic contaminants which tend to be extremely detrimental to various catalytic processes that may subsequently be carried out, such as hydrofining. Of the metallic contaminants, those containing nickel and vanadium are most common, although other metals are often present. These metallic contaminants, as well as others, are usually present within the bituminous material as organo-metallic compounds of relatively high molecular weight. A considerable quantity of the organometallic complexes are linked with asphaltenic material and contains sulphur. Of course, in catalytic hydrocracking procedures, the presence of large quantities of asphaltenic material and organic-metallic compounds interferes considerably with the activity of the catalyst with respect to the destructive removal of nitrogenous, sulphurous and oxygenated compounds. A typical Athabasca bitumen may contain 51.5 wt. % material boiling above 524° C., 4.48 wt. % sulphur, 0.43 wt. % nitrogen, 213 ppm vanadium and 67 ppm nickel.

As the reserves of conventional crude oils decline, these heavy oils must be upgraded to meet the demands. In this upgrading, the heavier material is converted to lighter fractions and most of the sulphur, nitrogen and metals must be removed. Most existing systems use coking processes which involve removal of carbon resulting in about 20% of material as coke. This represents an excessive waste of resources.

A recent improved procedure is described by Pruden, B. B. et al (CANMET Report 76-33, Department of Energy, Mines and Resources, Ottawa, Canada) in which hydrogen and heavy oil are pumped upwardly through an empty tubular reactor in the absence of a hydrocracking catalyst. It was found that the high molecular weight compounds hydrogenate and/or hydrocrack into lower boiling fractions, with simultaneous desulphurization, demetalization and denitrogenation reactions. For this procedure, reaction pressures of up to 3500 psig and temperatures up to 470° C. have been employed.

There have been some problems with the previous procedure at lower pressures due to the formation of coke deposits in the reactor. These deposits tend to form at the top of the reactor where the partial pressure of hydrogen and ash content are the lowest. The use of higher pressures has tended to reduce reactor fouling. At 3500 psig and 470° C., the fouling was almost eliminated. However, plant operations at high pressures involve higher capital and operating costs.

Several attempts have been made to reduce coke deposition at lower pressures. The process can be improved by either suppressing the coke formation reactions or preventing the coke build up on the reactor walls. Mineral matter or coal "getters" have been used to reduce the build up of coke. The use of coal as a getter has been described in Ternan et al copending Canadian application Ser. No. 269,020, filed Dec. 30, 1976.

It is the object of the present invention to overcome some of the problems of deposits forming in the reactor during the hydrocracking process.

SUMMARY OF THE INVENTION

In accordance with the present invention, there is described a process for hydrocracking a heavy hydrocarbon oil, a substantial portion of which boils above 524° C. which comprises:

(a) passing a slurry of said heavy hydrocarbon oil and an iron-coal catalyst in the presence of 500–50,000 scf of hydrogen per barrel of said hydrocarbon oil through a confined hydrocracking zone, said hydrocracking zone being maintained at a temperature between about 400° and 490° C., a pressure of at least 500 psig and a space velocity between about 0.5 and 4 volume of hydrocarbon oil per hour per volume of hydrocracking zone capacity, (b) removing from said hydrocracking zone a mixed effluent containing a gaseous phase comprising hydrogen and vaporous hydrocarbons and a liquid phase comprising heavy hydrocarbons, and (c) separating said effluent into a gaseous stream containing hydrogen and vaporous hydrocarbons and a liquid stream containing heavy hydrocarbons.

This process substantially prevents the formation of carbonaceous deposits in the reaction zone. These deposits, which may contain insoluble organic material, mineral matter, metals, sulphur, quinoline and benzene soluble organic material will hereinafter be referred to as "coke" deposits.

The process of this invention is particularly well suited for the treatment of heavy oils having a large proportion, preferably at least 50% by volume, which boils above 524° C. and which contains a wide boiling range of materials from naphtha through kerosene, gas oil and pitch. It can be operated at quite moderate pressure, preferably in the range of 500 to 3500 psig, without coke formation in the hydrocracking zone.

Although the hydrocracking can be carried out in a variety of known reactors of either up or down flow, it is particularly well suited to a tubular reactor through which it is moved upwardly. The effluent from the top is preferably separated in a hot separator and the gaseous stream from the hot separator can be fed to low temperature-high pressure separator where it is separated into a gaseous stream containing hydrogen and lesser amounts of gaseous hydrocarbons and a liquid product stream containing light oil product.

The iron compound which is used for the catalyst is one which converts into iron sulphide from the action of hydrogen and hydrogen sulphide. It may be an oxide of iron, an iron salt, such as a sulphate, sulphide, chloride, fluoride, nitrate, oxalate or carbonate or an iron hydroxide. A particular preferred compound is iron sulphate.

It has previously been known to use FeSO$_4$-lignite coke for the hydrogenation of crude naphtha and this is described, for instance, in German patent No. 829,344 (1952). Moreover, iron sulphate supported on coke has been used for hydrocracking of oils as described in German patent No. 933,648 (1955).

In the present invention, the iron-coal catalyst is not being used as a hydrocracking catalyst and has been found to have only very mild activity towards hydrodesulphurization and hydrocracking. However, when used in conjunction with the very heavy hydrocarbon oil feed, it has been found to be extremely effective in suppressing coke forming reactions and it has been seen that coke precursors (benzene or pentane insolubles) are significantly reduced.

The iron-coal catalyst used in accordance with this invention is preferably of quite small particle size, e.g. less than 60 mesh (Canadian Standard Sieve) and it is particularly preferred to use a material which will pass through a 100 mesh sieve. A typical catalyst will contain 5 to 95% by weight iron salt on coal (dry basis) and usually this catalyst is mixed with the heavy oil feed in an amount of 0.1–5 weight percent based on heavy oil feed.

The catalyst can conveniently be prepared by mixing 100 mesh coal and water in a 50—50 ratio in a mix-muller. A calculated amount of powdered iron salt (e.g. FeSO$_4$) is slowly added in the mix-muller and the batch is mixed for fifteen minutes. The iron-coal catalyst is then placed in trays and evenly spread. The mixture is then dried at 60° or until the moisture content is below 10 weight percent and the dried mixture is then passed through a 100 mesh screen before use. The particle size can be smaller or larger depending on the reactor geometry and coking tendencies of heavy hydrocarbon oil feed.

It has been found in accordance with this invention that particularly good results are obtained when the iron salt is supported on coal, preferably lignite or sub-bituminous coal. In the present process the catalyst is being specifically used to suppress coke formation and to remove coke deposits. Thus, it has been found to be particularly advantageous to deposit the iron salt on coal instead of coke or semi-coke. For instance, it has been observed that at hydrocracking conditions, lignite hydrogenates extensively and bituminous coal, coke or semi-coke hydrogenates the least. The extent of the hydrogenation of sub-bituminous coal is between the above extremes. Thus, an ideal slurry catalyst carrier for this hydrocracking process should hydrogenate partially, resulting in a reduction of particle size and these particles should leave with the product stream carrying some of the coke deposited. For the above reasons, it will also be clear that a coke or semi-coke carrier for this purpose is not satisfactory.

According to a preferred embodiment, the heavy hydrocarbon oil feed and iron-coal catalyst are mixed in a feed tank and pumped along with hydrogen through a vertical reactor. The liquid-gas mixture from the top of the hydrocracking zone is separated in a hot separator kept between 200°–470° C. and at the pressure of the hydrocracking reaction. The heavy hydrocarbon oil product from the hot separator can either be recycled or sent to secondary treatment.

The gaseous stream from the hot separator containing a mixture of hydrocarbon gases and hydrogen is further cooled and separated in a low temperature-high pressure separator. By using this type of separator, the outlet gaseous stream obtained contains mostly hydrogen with some impurities such as hydrogen sulphide and light hydrocarbon gases. This gaseous stream is passed through a scrubber and the scrubbed hydrogen is recycled as part of the hydrogen feed to the hydrocracking process. The recycled hydrogen gas purity is maintained by adjusting scrubbing conditions and by adding make up hydrogen.

The liquid stream from the low temperature-high pressure separator represents the light hydrocarbon oil product of the present process and can be sent for secondary treatment.

Some of the iron-coal catalyst will be carried over with the heavy oil product from the hot separator and will be found in the 524° C.+ pitch fraction. However, since this is a very cheap catalyst, it need not be recovered and can be burned or gasified with the pitch. At the start of the process, there tends to be some accumulation of iron-coal catalyst in the reactor system but this stabilizes after a few days of operation. The iron-coal catalyst concentration in the feed is normally between 0.1–5.0 weight percent, preferably about 1.0 weight percent. At hydrocracking conditions, the iron sulphate is converted to iron sulphide.

For a better understanding of the invention, reference is made to the accompanying drawing which illustrates diagrammatically a preferred embodiment of the present invention.

Heavy hydrocarbon oil feed and iron sulphate-coal catalyst are mixed together in a feed tank 10 to form a slurry. This slurry is pumped via feed pump 11 through inlet line 12 into the bottom of an empty tower 13. Recycled hydrogen and make up hydrogen from line 30 is simultaneously fed into the tower 13 through line 12. A gas-liquid mixture is withdrawn from the top of the tower through line 14 and introduced into a hot separator 15. In the hot separator the effluent from tower 13 is separated into a gaseous stream 18 and a liquid stream 16. The liquid stream 16 is in the form of heavy oil which is collected at 17.

The gaseous stream from hot separator 15 is carried by way of line 18 into a high pressure-low temperature separator 19. Within this separator the product is separated into a gaseous stream rich in hydrogen which is drawn off through line 22 and an oil product which is drawn off through line 20 and collected at 21.

The hydrogen rich stream 22 is passed through a packed scrubbing tower 23 where it is scrubbed by means of a scrubbing liquid 24 which is cycled through the tower by means of pump 25 and recycle loop 26. The scrubbed hydrogen rich stream emerges from the scrubber via line 27 and is combined with fresh make up hydrogen added through line 28 and recycled through recycle gas pump 29 and line 30 back to tower 13.

Certain preferred embodiments of this invention will now be further illustrated by the following non-limitative examples.

EXAMPLE 1

A catalyst was prepared by mixing 100 mesh sub-bituminous coal and water in a 50—50 ratio in a mix-muller. A predetermined amont of powdered FeSO$_4$ was slowly added to the mix-muller and the batch was mixed for fifteen minutes. The solid material thus obtained was then evenly spread in trays and dried at 60° C. until the moisture content was below 10% by weight. This dried material was then passed through a 100 mesh screen to obtain a catalyst containing 31% by weight of FeSO$_4$ on coal (dry basis).

EXAMPLE 2

The charge stock employed was an Athabasca bitumen having the following properties:

| | | |
|---|---|---|
| 1. | Specific gravity, 15/15° C. | 1.009 |
| 2. | Sulphur, % by wt. | 4.48 |
| 3. | Ash, % by wt. | 0.59 |
| 4. | Conradson Carbon Residue, % by wt. | 13.3 |
| 5. | Pentane insolubles, % by wt. | 15.5 |
| 6. | Benzene insolubles, % by wt. | 0.72 |
| 7. | Vanadium content, ppm | 213 |
| 8. | Nickel content, ppm | 67 |
| 9. | Total acid number, mg KOH/g | 2.77 |
| 10. | Total base number, mg KOH/g | 1.89 |
| 11. | Carbon, % by wt. | 83.36 |
| 12. | Hydrogen, % by wt. | 10.52 |
| 13. | Nitrogen, % by wt. (Dohrmann microcoulometer) | 0.43 |
| 14. | Chlorine, % by wt. | 0.00 |
| 15. | Viscosity at 38° C. (Cst) | 10000 |
| 16. | Pitch (524° C.+) % by wt. | 51.5 |

The above feed stock was passed through a reaction sequence as shown in the attached drawing using the catalyst of Example 1, with the operating conditions being as follows:

| | |
|---|---|
| Pressure, psig | 1500 |
| Reactor Temp., °C. | 465 |
| Liquid Hourly space velocity | 3.0 |
| Recycled gas rate, scf/h | 197 |
| Hot Separator Temp., °C. | 370 |
| Cold Separator Temp., °C. | 23 |
| Recycle gas purity (hydrogen) vol % | 85 |

Initially, the iron sulphate-coal catalyst used was 2 wt. % of feed stock. After 121 hours of operation the catalyst concentration in the feed was decreased to 1 wt. % of feed. The plant was run for another 381 hours and was shut down for inspection. At the end of the run only about 50 g of solids, as dust, deposits and residue were found in the system. At the same operating conditions, a hydrocracking process could not be operated for more than a few hours in the absence of an iron sulphate-coal catalyst, as the reaction inlet, outlet and transfer lines became plugged.

The results obtained for this run are as follows:

| | | |
|---|---|---|
| 1. | Pitch (524° C.+) conv., wt % | 73.3 |
| 2. | Sulphur conv. wt % | 40.6 |
| 3. | Hydrogen consumed, g mole/kg of feed | 4.63 |
| 4. | Product volume yield, vol. % | 101.3 |
| 5. | Product weight yield, wt % | 93.3 |
| 6. | Product gravity, 15/15° C. | 0.934 |
| 7. | Sulphur in product, wt. % | 2.94 |
| 8. | Benzene insolubles in product, Wt. % | 2.11 |
| 9. | Pentane insolubles in product, Wt. % | 11.80 |

It will be seen from the above table that a very large percentage of the pitch was converted into lower boiling fractions.

EXAMPLE 3

The same charge stock used in Example 2 was tested to compare thermal hydrocracking with hydrocracking in the presence of iron sulphate-coal catalyst. The operating conditions for the two runs (with and without iron sulphate-coal catalyst) were as follows:

| | No additive | Iron Sulphate-Coal |
|---|---|---|
| Amount of additive, Wt. % | 0 | 1 |
| Pressure, psig | 1500 | 1500 |
| Reactor Temp. °C. | 450 (384 hrs.) | 450 (58 hrs.) 455 (454 hrs.) |
| Liquid hourly space velocity | 3.0 | 3.0 |
| Recycle gas rate, scf/h | 197 | 197 |
| Hot Separator temp., °C. | 370 | 370 |
| Cold Separator temp., °C. | 23 | 23 |
| Recycle Gas Purity (hydrogen), vol. % | 85 | 85 |

The hydrocracking experiment with iron sulphate-coal catalyst was carried out at 5° C. higher than the thermal hydrocracking to obtain equivalent pitch conversion. The results obtained were as follows:

| | | No Additive | Iron Sulphate-coal |
|---|---|---|---|
| 1. | Pitch conv. Wt. % | 60.6 | 58.9 |
| 2. | Sulphur conv. Wt. % | 29.9 | 36.3 |
| 3. | Hydrogen consumed, g mole/kg | 2.6 | 3.8 |
| 4. | Product volume yield, vol. % | 100 | 100.1 |
| 5. | Product weight yield, wt. % | 94.2 | 94.8 |
| 6. | Product gravity, 15/15° C., | 0.954 | 0.953 |
| 7. | Sulphur in product, wt. % | 3.33 | 3.01 |
| 8. | Benzene insolubles, wt. % | 2.09 | 1.36 |
| 9. | Pentane insolubles, wt. % | 11.80 | 8.65 |
| 10. | Total Solids Deposits in the system, g. | 6600 | <10 |

It can be clearly seen from these results that the solids deposited were negligible in the case of iron sulphate-coal catalyst. The hydrogen consumption was slightly higher and it is believed that this was caused by higher desulphurization, hydrogenation and reduction in coke and coke precursor formation. The addition of iron sulphate-coal catalyst to the feed significantly improved plant performance by reducing solids deposits.

EXAMPLE 4

(a) The charge stock employed was a Lloydminster heavy oil residuum having the following characteristics:

| | Lloydminster heavy oil Residuum |
|---|---|
| Specific gravity, 15/15° C. | 1.035 |
| Sulphur, % by wt. | 5.02 |
| Ash, % by wt. | 0.048 |
| Conradson Carbon Residue, % by wt. | 18.8 |
| Pentane Insolubles, % by wt. | 25.7 |
| Benzene Insolubles, % by wt. | 0.07 |
| Vanadium content, ppm | 125 |
| Carbon % by wt. | 84.08 |
| Hydrogen, % by wt. | 10.17 |
| Nitrogen, % by wt. (Dohrmann microcoulometer) | 0.47 |
| Water, % by wt. | 0.1 |
| Viscosity at 83° C. (Cst) | 14800 (at 83° C.) |

-continued

| | Lloydminster heavy oil Residuum |
|---|---|
| Pitch (524° C.+) % by wt. | 81.2 |

Again this charge stock was hydrocracked in the pilot plant shown in the drawing. The charge stock was combined with 1% by weight of iron sulphate-coal catalyst and the test was carried out for 400 hours. The operating conditions and results were as follows:

| | |
|---|---|
| Pressure, psig | 1500 |
| Reactor Temp., °C. | 445 |
| Liquid hourly space velocity | 3.0 |
| Recycle gas rate, scf/h | 197 |
| Recycle Gas Purity (hydrogen) vol. % | 85 |
| Hot Separator temp. °C. | 370 |
| Pitch conv. wt. % | 45.3 |

At the end of the run there were only 7.5 g of deposits in the reactor, a very insignificant amount when considering the properties of the Lloydminster heavy oil residuum.

(b) A thermal hydrocracking run without any iron sulphate-coal catalyst was carried out at the same reaction conditions as in part (a). It was observed after about 7 days of operation that there were 220 g of solids in the system and the operability was poor (indicated by a high pressure drop of 500 psig). This showed that addition of iron sulphate-coal catalyst significantly improved the operation and reduced coke and coke precursor formation.

The embodiments of the invention in which an exclusive property or privilege is claimed are defined as follows:

1. A process for hydrocracking a heavy hydrocarbon oil, a substantial proportion of which boils above 524° C. which comprises:
    (a) passing a slurry of said heavy hydrocarbon oil and an iron-coal catalyst in the presence of 500–50,000 s.c.f. of hydrogen per barrel of said hydrocarbon oil through a confined hydrocracking zone, said hydrocracking zone being maintained at a temperature between about 400° and 490° C., a pressure above 500 psig and a space velocity between about 0.5 and 4.0 volumes of heavy hydrocarbon oil per hour per volume of hydrocracking zone capacity,
    (b) removing from said hydrocracking zone a mixed effluent containing a gaseous phase comprising hydrogen and vaporous hydrocarbons and a liquid phase comprising heavy hydrocarbons, and
    (c) separating said effluent into a gaseous stream containing hydrogen and vaporous hydrocarbons and a liquid stream containing heavy hydrocarbons.

2. A process according to claim 1 wherein the slurry is moved upwardly through a tubular reactor.

3. A process according to claim 2 wherein the iron compound is one which converts into iron sulphide under reaction conditions.

4. A process according to claim 3 wherein the iron compound is an iron salt or an iron oxide.

5. A process according to claim 4 wherein the iron compound is iron sulphate.

6. A process according to claim 4 wherein at least 50 volume percent of said heavy hydrocarbon oil boils above 524° C.

7. A process according to claim 6 wherein the catalyst contains 5–95% by weight of said iron compound.

8. A process according to claim 7 wherein the coal is a lignite or sub-bituminous coal.

9. A process according to claim 8 wherein the coal is −60 mesh (Canadian Sieve).

10. A process according to claim 9 wherein the coal is −100 mesh.

11. A process according to claim 10 wherein the catalyst is present in an amount of 0.1–5% by weight based on heavy hydrocarbon oil charge stock.

12. A process according to claim 8 wherein the hydrocracking is conducted at a pressure in the range of 500 to 3,500 psig.

13. A process according to claim 2 wherein the mixed effluent is separated in a hot separator.

14. A process according to claim 13 wherein the gaseous stream from the hot separator is cooled and separated in a low temperature separator into a gaseous stream containing hydrogen and lesser amounts of gaseous hydrocarbons and a liquid product stream containing light oil products.

* * * * *